(12) United States Patent
Perrier et al.

(10) Patent No.: US 10,006,724 B2
(45) Date of Patent: Jun. 26, 2018

(54) MULTIPLY-CLAD BRAZING METAL SHEET (71) Applicant: CONSTELLIUM NEUF-BRISACH, Biesheim (FR)

(72) Inventors: Malika Marie Perrier, Grenoble (FR); Alireza Arbab, Rives (FR); Lionel Peguet, Quaiz-en-Chartreuse (FR); Myriam Delhomme, Grenoble (FR)

(73) Assignee: CONSTELLIUM NEUF-BRISACH, Bieshem (FR)

( * ) Notice: Subject to any disclaimer, the term of this patent is extended or adjusted under 35 U.S.C. 154(b) by 0 days. days.

(21) Appl. No.: 15/123,481

(22) PCT Filed: Feb. 26, 2015

(86) PCT No.: PCT/FR2015/000041
§ 371 (c)(1),
(2) Date: Sep. 2, 2016

(87) PCT Pub. No.: WO2015/132482
PCT Pub. Date: Sep. 11, 2015

(65) Prior Publication Data
US 2017/0074604 A1    Mar. 16, 2017

(30) Foreign Application Priority Data
Mar. 6, 2014    (FR) .................... 14 00551

(51) Int. Cl.
*B32B 15/01*    (2006.01)
*F28F 13/18*    (2006.01)
(Continued)

(52) U.S. Cl.
CPC ........ *F28F 13/182* (2013.01); *B23K 35/0233* (2013.01); *B23K 35/0238* (2013.01);
(Continued)

(58) Field of Classification Search
None
See application file for complete search history.

(56) References Cited

U.S. PATENT DOCUMENTS 6,923,876 B2 *  8/2005  Kucza ................... B32B 15/016
                                                    148/523
7,226,669 B2 *  6/2007  Benedictus .......... B23K 1/0012
                                                    148/523
(Continued)

FOREIGN PATENT DOCUMENTS

DE        19823790 A1    12/1999
EP         2656932 A1     4/2012
(Continued)

OTHER PUBLICATIONS

International Search Report as issued in the PCT/FR2015/000041 dated Jun. 23, 2015.
(Continued)

*Primary Examiner* — Daniel J. Schleis
(74) *Attorney, Agent, or Firm* — McBee Moore Woodward & Vanik IP, LLC; Susan E. Shaw McBee; David Vanik (57) ABSTRACT

Brazing sheet consisting of a series AA3xxx aluminum alloy core sheet, coated, on at least one side, with a cladding layer made of a first so-called intermediate aluminum alloy containing 0.35 to 1.8 wt % manganese, less than 0.3 wt % of each of other elements, and a total of 1 wt % balance aluminum, itself coated with a second series AA4xxx alloy cladding layer, in which the alloy of the core sheet is selected, and the core sheet developed, such as to have an essentially recrystallized structure after brazing.

17 Claims, 3 Drawing Sheets

(51) Int. Cl.
*B23K 35/28* (2006.01)
*B23K 35/02* (2006.01)
*C22C 21/00* (2006.01)

(52) U.S. Cl.
CPC .......... *B23K 35/286* (2013.01); *B32B 15/016* (2013.01); *C22C 21/00* (2013.01)

(56) References Cited

U.S. PATENT DOCUMENTS

| | | | | |
|---|---|---|---|---|
| 7,255,932 | B1* | 8/2007 | Kilmer | B23K 35/002 165/905 |
| 2002/0142185 | A1 | 10/2002 | Kilmer | |
| 2005/0067066 | A1* | 3/2005 | Tanaka | B32B 15/016 148/535 |
| 2007/0051503 | A1* | 3/2007 | Grajzl | F02B 29/0456 165/152 |

FOREIGN PATENT DOCUMENTS

| | | |
|---|---|---|
| JP | 2003027166 A | 1/2003 |
| WO | 2003089237 A1 | 10/2003 |
| WO | 2006044500 A2 | 4/2006 |
| WO | 2007042206 A1 | 4/2007 |
| WO | 2009142651 A2 | 11/2009 |
| WO | WO2013180630 * | 12/2013 |

OTHER PUBLICATIONS

International Preliminary Examination Report as issued in the PCT/FR2015/000041 dated May 12, 2016.

"Material Selection and Fabrication"; In: Kuppan Thulukkanam: "Heat Exchanger Design Book (Second Edition)"; CRC Press, Taylor & Francis Group, NY, XP002733077; Feb. 4, 2013; pp. 852-853.

* cited by examiner

MULTIPLY-CLAD BRAZING METAL SHEET

CROSS REFERENCE TO RELATED APPLICATIONS

This application is a § 371 National Stage Application of PCT/FR2015/000041, filed Feb. 26, 2015, which claims priority to FR1400551, filed Mar. 6, 2014.

BACKGROUND

Field of the Invention

The invention relates to the field of brazing sheets for heat exchanger plates or tubes made of aluminum alloys, in particular those used for the cooling or the optimization of the output of engines, the heating or the air conditioning of the passenger compartment, but also for any other heat exchange function, in motor vehicles.

Are however more particularly concerned the sheets for exchanger tubes or plates subjected to a severe corrosive environment such as the tubes or plates of charge air coolers subjected to a recirculation of the exhaust gases or air conditioning evaporator plates.

Description of Related Art

Aluminum alloys are now mostly used in the manufacture of heat exchangers for the automobile due to their low density, which allows for a lower weight, in particular with respect to copper alloys, while still providing good thermal conduction, easy implementation and good resistance to corrosion.

All of the aluminum alloys that are concerned in what follows are designated, unless mentioned otherwise, according to the designations defined by the "Aluminum Association" in the "Registration Record Series" that it publishes on a regular basis.

The exchangers comprise tubes or plates for the circulation of the internal fluid and fins or inserts, as well as possibly a disruptor, in order to increase the heat transfer between the internal fluid and the external fluid, and their manufacture is carried out either by mechanical assembly, or by brazing.

In the case of charge air coolers, known to those skilled in the art as CACs, the usual configuration is as follows: the core sheet constituting the tube or the plate, generally made from the series AA3xxx aluminum alloy, is coated on its external and internal sides with a so-called brazing alloy, generally from the series AA4xxx. The latter has the interest of melting at a temperature less than the melting temperature of the core and, by application of a thermal brazing cycle, of being able to create a bond between two materials to be assembled, i.e. brazed, with the alternative being welding.

Figure 1:
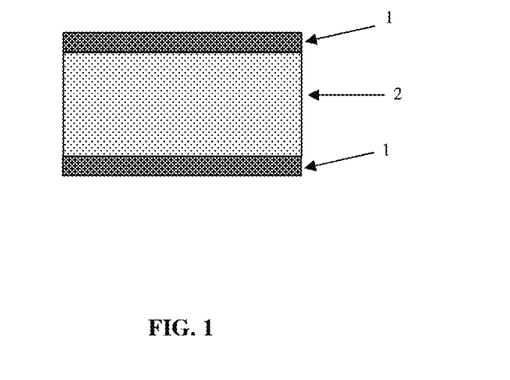
FIGS. 1-6 depict embodiments as described herein.

This configuration is shown in FIG. 1, with the core of the strip with tube bearing the mark 2 and its brazing alloy internal and external claddings bearing the mark 1. The inserts, which are positioned between the various rows of tubes, are comprised of a non-clad series AA3xxx alloy. In the same way, the disruptors, which are inserted into the tubes, are also made of series AA3xxx alloy and are not clad. The brazing of the inserts on the tubes is provided by the AA4xxx cladding of the external side of the tube. The brazing of the disruptors in the tubes is provided by the 4xxx cladding of the internal side of the tube. The AA3xxx alloys used for the inserts and the disruptors can be identical or not. The series AA3xxx alloy used for the core of the tube is most often made from a so-called "long-life" alloy, i.e. with good resistance to external corrosion, saline.

Figure 2:
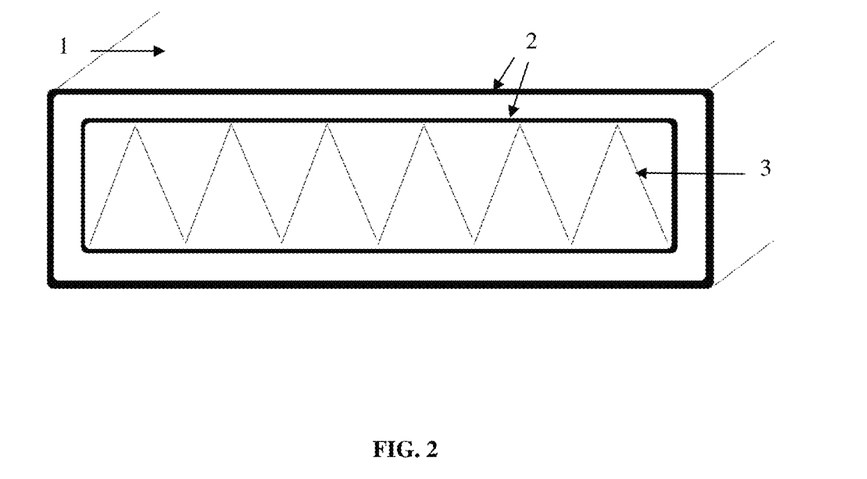

A diagram of such a tube with disruptor is shown in FIG. 2, with the tube bearing mark 1, the disruptor bearing the mark 3 and the brazing alloy claddings bearing the mark 2.

An example of this is described in application EP 0283937 A1 of Nihon Radiator Co. Ltd.

There are also charge air coolers as well as plate air conditioning circuit evaporators which therefore comprise fins or inserts on each side and also require the presence of a series AA4xxx brazing alloy layer on each one of them.

Moreover, the designs of engines wherein exhaust gases are mixed with the exterior atmospheric air and reinjected into the intake via a passage by the charge air cooler, are increasingly frequent today, with the final purpose of reducing the polluting emissions of the vehicles.

In this configuration, the exhaust gases, able to be condensed, can generate in the cooler a corrosive medium that is particularly severe, characterized in particular by a low pH (able to be significantly less than 3).

Air conditioning plate evaporators are also subjected to a corrosive attack, in conditions that are however less severe, linked to the projections in particular saline projections from the road environment.

In the configuration with tubes or plates such as described hereinabove, a substantial diffusion of the silicon, contained in the cladding alloy of the series AA4xxx, to the core alloy constituting the heart of the tube is produced during the brazing operation, degrading through this its capacity to resist corrosion.

Generally, in order to improve the resistance to corrosion of brazing sheets, and substantially in the case of tubes with circulation of a coolant internally, a solution consists in replacing series AA4xxx brazing alloy internal cladding with a so-called "sacrificial" protective cladding made of a relatively pure alloy, of the series AA1xxx or AA7xxx. However, in the case of plate exchangers such as described hereinabove, or tubes with disruptor, where the assembly via brazing is required on both sides, this solution can obviously not be applied.

An alternative known to those skilled in the art consists in inserting during roll cladding, between the core alloy of the tube and its series AA4xxx internal brazing alloy coating, an intermediate cladding made from the series AA1xxx or AA7xxx alloy.

Figure 3:
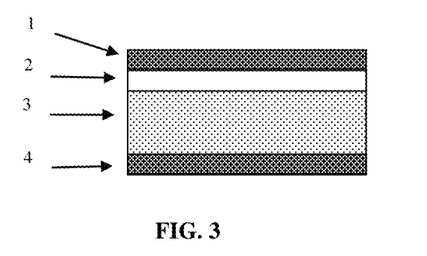

Such a configuration is diagrammatically shown in FIG. 3, with the core of the tube bearing the mark 3, the exterior coating made of series AA4xxx alloy bearing the mark 4, the interior coating also made of series AA4xxx alloy bearing the mark 1 and the intermediate coating made of series AA1xxx or AA7xxx alloy the mark 2.

Such an intermediate coating improves the behavior in corrosion according to two mechanisms:

It limits the diffusion, during brazing, of the silicon of the internal cladding to the core of the tube and inversely of elements such as copper of the core to the cladding, but also, it provides a protection of the sacrificial anode type, with the corrosion potential of the intermediate layer being less than that of the cladding.

These "multi-clad" sheets are known to those skilled in the art and are described in particular in applications JP 2003027166 A of Kobe Steel Ltd. Shinko Alcoa, JP 2005224851 A of Shinko Alcoa Yuso Kizai KK, WO 2006/044500 A2 and WO 2009/142651 A2 of Alcoa Inc, WO 2007/042206 A1 of Corus Aluminum Walzprodukte GmbH, US 2010/0159272 A1 of Novelis, etc.

The use of this type of "multi-clad" sheets in a charge air cooler with passage of exhaust gases is described in application WO 2008/063855 of Modine Mfg Co.

It is also the object of the publication "*New Advanced Materials—New Opportunities for Brazed HX Folded Tubes & Hydro MultiClad Materials*", Hartmut Janssen, 7th Aluminum Brazing Conference, 2012, as well as applications WO2009/128766A1 of "Sapa Heat Transfer AB", WO03/089237, EP2065180A1, WO2006/044500A2 of "Alcoa Inc.", WO2007/042206A1 and FR2876606 of "Corus Aluminum Walzprodukte GmbH".

However, although such configurations make it possible to improve the resistance to corrosion of the tube somewhat, they can be insufficient in particularly severe stress conditions, as is the case for heat exchangers subjected to a recirculation of the exhaust gases characterized in particular by a low pH.

Furthermore, the alloys used for the intermediate layer having a low flow stress at high temperature, the hot rolling of a multilayer composite that includes them is particularly difficult. Industrial trials conducted on twelve coils by the applicant have shown roll cladding to be very difficult and even impossible.

Another method proposed in order to overcome the problems with rolling, is multi-alloy casting by the methods of either Simultaneous Multi-Alloy Casting (SMAC) or Uni-directional Solidification of Casting (USoC) of Alcoa. The principle is described in detail in application WO2009/142651A2 for the two methods. However, the costs of this type of casting are relatively high and the implementation thereof is delicate.

Other solutions consist in the application of a surface treatment after brazing. Such is the case with the solution described in application FR 2916525 A1 of Valeo Systèmes Thermiques, which recommends a resin-based coating for the inside of exchanger tubes. Another example of surface treatment, here an electro-ceramic deposit, is given in application WO 2010/019664. Application FR 2930023 of Valeo Systèmes Thermiques mentions the possibility of carrying out a boehmitage of all of the exchanger. Finally, application EP 1906131 A2 of International Truck describes a solution that consists in the application of a metal surface treatment with a Ni or Co base.

Such options are however too expensive to form an entirely satisfactory realization from an industrial standpoint.

A known solution to facilitate rolling consists in increasing the hot flow stress of the intermediate cladding, in particular by the adding of hardening elements. This is the case with titanium, with content ranging up to 0.3% as mentioned in application WO2009/128766A1 of "Sapa Heat Transfer AB". Manganese is also mentioned therein as a hardener by solid solution.

With regards to this, the applications hereinabove, as well as WO2009/142651A2 from "Alcoa Inc." claim an intermediate layer made of series AA3xxx alloy.

The alloy of the AA3003 type is also conventionally used in the exchangers, as it has a very good compromise for mechanical resistance, corrosion and formability. However, its high content in iron (up to 0.7%) makes it more sensitive to corrosion than an alloy of the AA1050 type for example. In addition, the presence of copper up to 0.2% makes it less sacrificial and more sensitive to corrosion in general and intergranular in particular.

The invention aims to optimize the choice of the composite material or aluminum alloy multilayer brazing sheet, and in particular of the core and of the intermediate cladding, intended for the carrying out of exchangers, in order to improve their behavior in a severe corrosive environment such as that created by the recirculation of the exhaust gases of a motor vehicle, and to a lesser degree air conditioning evaporators, without any additional material used or clogging or notable weight and which authorizes conditions for manufacture using brazing sheets that are at least equivalent, from the point of view of ease in implementation and cost, to the solutions of prior art.

SUMMARY

The invention has for object a brazing sheet consisting of a series AA3xxx aluminum alloy core sheet, coated, on at least one side, with a cladding layer made of a first so-called intermediate aluminum alloy containing 0.35 to 1.8% wt % manganese, less than 0.3 wt % of each of other elements, and a total of 1 wt % balance aluminum, itself coated with a second series AA4xxx alloy cladding layer, in which the alloy of the core sheet is selected, and the core sheet developed, such as to have an essentially recrystallized structure after brazing.

DETAILED DESCRIPTION OF A PREFERRED EMBODIMENT

The term "essentially recrystallized structure" means a structure of which the proportion of recrystallized grains is at least 90% and preferably 100%.

To this effect, the presence of anti-recrystallization elements of the Cr, V, Zr and Sc type is controlled and limited and the slab intended for the manufacture of the core sheet undergoes after casting and scalping, and before roll cladding, a homogenization at a temperature from 550 to 630° C. for at least one hour.

According to a preferred embodiment the composition of the intermediate layer is as follows (wt %):
Si:<0.3 Fe<0.3 Cu<0.05 Mn: 0.35-1.8 Mg<0.02 Cr<0.15 Ti<0.15 Zr<0.15, other elements<0.05 each and 0.15 in total, balance aluminum.

Advantageously, the content in Mn of the intermediate layer is between 0.35 and 1.7%, better 0.35 and 1.4%.

According to a more preferred embodiment, the composition of the intermediate layer is as follows (wt %):
Si:<0.2 Fe<0.2 Cu<0.05 Mn: 0.35-1.4 Mg<0.02 and better, at most 0.01% Cr<0.05 Ti<0.15 Zr<0.05, other elements<0.05 each and 0.15 in total, balance aluminum.

In the two aforementioned embodiments, the content in Mn of the intermediate layer is advantageously between 0.5 and 0.9% and better between 0.6 and 0.8%.

Moreover, the side of the core sheet opposite the side coated with said first so-called intermediate cladding layer can be coated with a series AA4xx alloy cladding layer or with another intermediate cladding layer of the same composition as the first, itself coated with a series AA4xxx alloy cladding layer.

According to the most common embodiment, cladding sheets, intermediate and external made with an alloy of the AA4xxx type, each have a thickness from 5 to 10% of the total thickness of the brazing sheet.

A brazing sheet carried out in accordance with the aforementioned requirements has, after brazing, a lifespan without perforation of the core sheet to the SWAAT test, according to the standard ASTM G85-A3, of more than 8 weeks.

Such brazing sheets can advantageously be used for the manufacture of a motor vehicle heat exchanger, in particular of a heat exchanger of the charge air cooler (CAC) type, or an exchanger of the "Evaporator" type in air conditioning circuits.

The invention also has for object a heat exchanger of the charge air cooler (CAC) type, or a heat exchanger of the "Evaporator" type of an air conditioning circuit, manufactured from sheets such as mentioned hereinabove.

DESCRIPTION OF THE FIGURES

FIG. 1 shows, a brazing sheet of prior art with three layers, with the core sheet bearing mark 2 and the brazing alloy (also called cladding layer), present on each one of the sides of the core, bearing the mark 1.

FIG. 2 diagrammatically shows a tube 1 with disruptor 3, a fin or an insert (not shown, outside of the tube) that can be assembled on the external side of the tube by brazing. In the same way, the disruptor is assembled onto the internal side of the tube by brazing. For this purpose, the 2 sides of the tubes are coated with a so-called brazing or cladding material generally of the series AA4xxxx (mark 2 in the figure).

FIG. 3 diagrammatically shows the brazing sheet used for the tube of FIG. 2, but where has been inserted, between the core alloy of the tube and its series AA4xxx brazing allow internal coating, an intermediate cladding.

The core of the tube bears the mark 3, the exterior coating made of series AA4xxx alloy bearing the mark 4, the interior coating also made of series AA4xxx alloy bears the mark 1 and the intermediate coating bears the mark 2.

Figure 4:
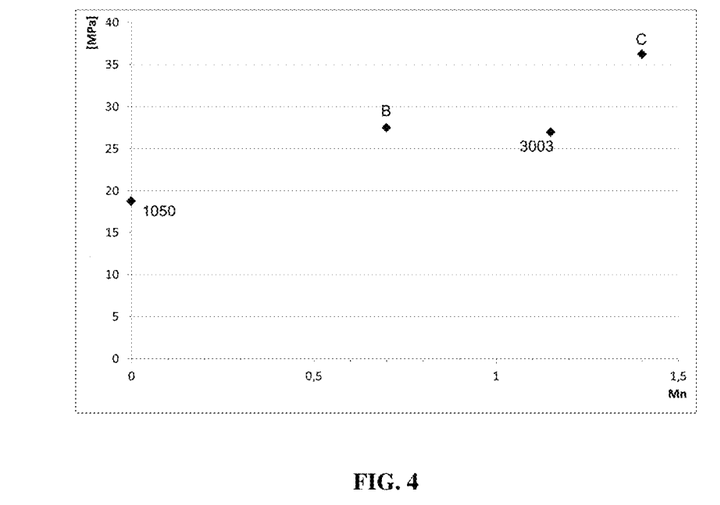

FIG. 4 shows the results of the hot rheology tests on alloys AA1050, AA3003, B of the trial B and C of the trial C of chapter "Examples" and at 480° C.

The y-axis show the flow stress in MPa and the x-axis the content in Mn (wt %).

Figure 5:
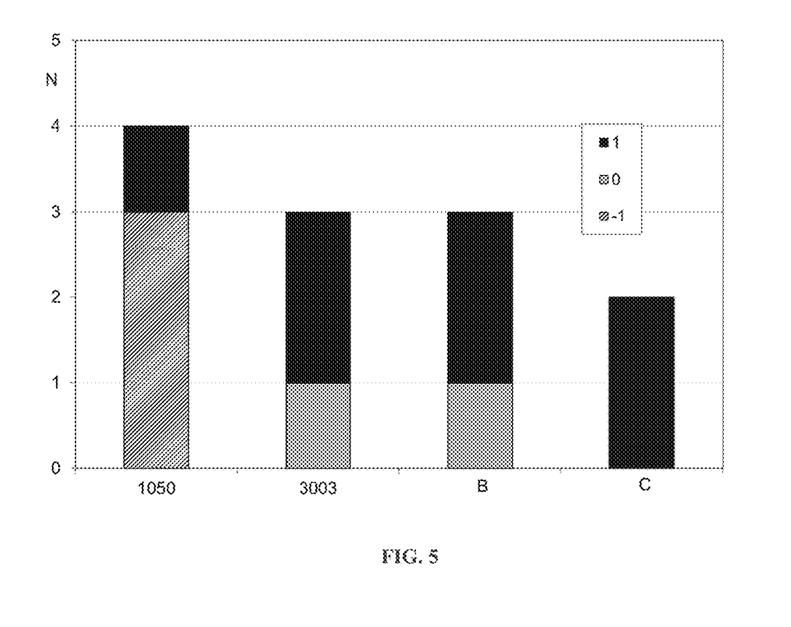

FIG. 5 shows the results of rolling trials on multilayer materials with different intermediate layers: AA1050, AA3003 and two alloys according to the invention, "B" from trial B and "C" from trial C of the chapter "Examples".

The y-axis show the number of trials N, and the x-axis the type of alloy and to the right the result.

1 corresponds to an entirely successful cladding.

0 corresponds to a satisfactory cladding, that may contain a few defects at the beginning and at the end of roll cladding of the composite material.

−1 corresponds to the absence of adhesion during the roll cladding.

Figure 6:
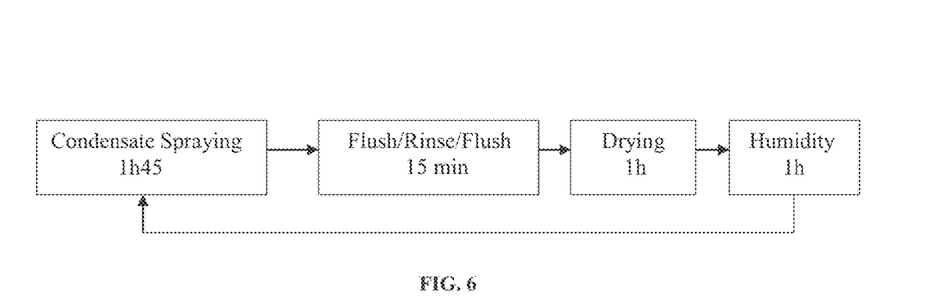

FIG. 6 shows the diagram of the cycle of the test developed specifically by the applicant in order to reproduce the particular conditions of corrosion of CACs (charge air coolers) and carried out in a climatic chamber at a temperature of 50° C.

DESCRIPTION OF THE INVENTION

The invention consists in a wise choice of the alloy for the intermediate cladding (or layer) and, for the core, of the alloy type, i.e. of the series AA3xxx, and of its metallurgical temper, for the carrying out of a brazing sheet of the "multilayered type, adapted to the severe conditions of corrosion that in service these materials are subjected to in particular charge air coolers (CACs) or passenger compartment air conditioning evaporators.

This increased resistance to corrosion is obtained thanks to the presence of an intermediate layer between the core and the brazing cladding on at least one side. Moreover, the core is made of series AA3xxx alloy (typically 3915 or 3916) having been subjected, after casting of the slab and before rolling, to a homogenization at a temperature from 550 to 630° C. for at least one hour, the cladding brazing alloy is the series AA4xxx (typically 4045 or 4343) and the intermediate cladding alloy is an aluminum alloy comprising 0.35 to 1.8% manganese, less than 0.3% of each one of the other elements and less than 1% of the total of said other elements, balance aluminum, such as in particular according to the preferred composition given in table 1.

TABLE 1

| Intermediate layer | Si | Fe | Cu | Mn | Mg | Cr | Zn | Ti | Zr | Other |
|---|---|---|---|---|---|---|---|---|---|---|
| General | <0.3 | <0.3 | <0.05 | 0.35-1.8 | <0.02 | <0.15 | / | <0.15 | <0.15 | <0.05 |
| Preferred | <0.20 | <0.20 | / | 0.35-1.4 | / | / | / | 0-0.15 | / | / |

The ranges of concentration imposed on the elements that contain the alloy of the intermediate layer can be explained by the following reasons:

Si has an unfavorable effect on the resistance to corrosion by pitting. Because of this, its content must be less than 0.3% and preferably 0.2%.

Fe generally constitutes an impurity for aluminum; the phases with iron constitute privileged sites for the initiation of corrosion pits. Because of this, its content must be less than 0.3% and more preferably 0.2%.

Cu also increases the corrosion potential as such reducing the sacrificial anode effect. Through its non-homogeneous distribution within the alloy, it can also increase the risks of galvanic corrosion and can favor the intergranular corrosion by the presence of phases of the $Al_2Cu$ type at the seals of the grains in particular. Because of this, its content must be limited to that of an impurity, i.e. less than 0.05%, in order to prevent the phenomena of dissolution then re-precipitation of the copper at the surface.

Mn is a hardening element; it has a positive effect on the resistance after brazing by hardening in solid solution and in the form of fine precipitates. But especially, it improves the hot flow stress of the alloy (cf. FIG. 4) which greatly facilitates the roll cladding. Below 0.35%, this effect is insufficient. However, beyond 1.8 and even 1.7%, it gives rise to the formation of coarse intermetallic phases that are highly unfavorable to the castability of the alloy. A good compromise is between 0.35 and 1.4%, and better between 0.5 and 0.9% and is optimized between 0.6 and 0.9%.

Mg has a positive influence on the mechanical resistance, but it is harmful to brazability, in that it migrates to the surface of the cladding and, especially in the case with "CAB" brazing of the "Nocolok®" type, by forming a layer of oxide that unfavorably modifies the properties of the brazing. For this reason, and for such difficult applications, its content has to be limited to 0.02% and even 0.01%, in accordance with patent EP 1075935 B1 of the applicant.

Zn could lower the corrosion potential excessively, as such making the intermediate layer too sacrificial with the risk of very fast corrosion of the latter.

Ni and Co, just like iron have a negative effect on the resistance to corrosion, but also to bending. Because of this, their content must be reduced to that of an impurity.

Ti can be added up to a content of 0.15% as it has a slight hardening effect, but also, it improves the behavior in corrosion of the alloy, with the titanium concentrating on the layers parallel to the rolling direction, which favors a lateral corrosion rather than a corrosion via penetrating pitting.

Cr, V, Zr and Sc improve in particular the mechanical resistance after brazing, but also act favorably on the resistance to corrosion. However, as this entails anti-recrystallization elements, they must be limited in order to ensure the recrystallization of the core sheet during brazing, contrary to the path chosen according to application WO2006/004500A2 of "Alcoa Inc." which prevents said recrystallization during brazing. Moreover, they accentuate the risk of forming primary phases at casting. Adding them is as such possible but up to a maximum content of 0.15% each.

With regards to the side of the core sheet opposite the side coated with said first so-called intermediate cladding layer then with a series AA4xxx alloy cladding layer it can be coated directly with a series AA4xxx alloy cladding layer, but an advantageous alternative of this configuration is a symmetrical multi-clad composite material, i.e. provided with an intermediate cladding of the two sides of the core, with one providing resistance to internal corrosion and the other to external corrosion, as is particularly favorable in particular in the case of the application to exchangers of the "CAC" type.

With regards to the core sheet, it has after brazing a recrystallized structure with elongated grains, i.e. having a aspect ratio F (maximum length/maximum width) greater than 2.

In order to obtain this result, the presence of anti-recrystallization elements of the Cr, V, Zr and Sc type is controlled and limited and the slab intended for the manufacture of the core sheet undergoes, after casting and scalping, and before rolling, a homogenization at a temperature from 550 to 630° C. for at least one hour.

It is then coated with cladding blanks; the assembly is hot rolled to a thickness typically of 3 mm then cold rolled to a thickness typically of 0.2 to 1.2 mm.

"At this stage, the brazing sheet is at a temper known to those skilled in the art under the name "H18" temper.

But the sheet at temper "H18" has a formability that is very limited, making it difficult to manufacture exchanger elements.

Because of this, it is most commonly subjected to a final annealing at a temperature between 250 and 450° C., conferring the temper known to those skilled in the art under the name of "O" temper and leading to the recrystallization of the alloy into a microstructure with elongated grains, which is retained during brazing.

More precisely, the homogenization of the core makes it possible to increase the manganese containing dispersoid phases, which then are no longer a hindrance to the recrystallization. This recrystallized temper of the core has two advantages:

Obtaining formability that is sufficient for the stamping operations of the brazing sheet.

Eliminating the risk of an excessively fast corrosion of the core in the case of a dissymmetrical configuration, without intermediate cladding on one of the two sides, but only a series AA4xxx alloy.

Indeed, in the case where the structure of the core would be fibered, the corrosion would penetrate more easily than in the case of a microstructure with elongated grains.

Such brazing sheets are as such particularly adapted to the manufacture of charge air coolers (CACs) or passenger compartment air conditioning evaporators due in particular to a good stamping behavior, and also due to the fact that the brazed assemblies manufactured from these strips have a lifespan without perforation of the core sheet to the SWAAT test of at least 8 weeks. They also have a corrosion behavior that is clearly improved in the operating conditions of a charge air cooler or CA, in an acidic medium, such as reproduced by the test described in the chapter Examples set forth herein.

The microstructural studies carried out on brazed parts show a fully recrystallized temper in all of the zones, and an absence of the phenomenon known to those skilled in the art under the name of LFM ("Liquid Film Migration").

The invention consists of the best possible compromise to date between the aptitude for rolling and resistance to corrosion. It is differentiated from known prior art by this recrystallized structure with elongated grains and by manganese addition in order to harden the alloy of the intermediate layer, while still retaining a minimum content of impurities participating in good resistance to corrosion.

In its details, the invention shall be better understood using the examples hereinafter, which however are not of a limiting nature.

Examples

Several AA3916 core alloy slabs were cast, AA4343 brazing alloy as well as alloy slabs marked A, B and C, for intermediate layer according to the invention, and AA1050 and AA3003 alloy slabs.

The AA3916 alloy had the following composition (wt %):

Si: 0.18 Fe: 0.15 Cu: 0.65 Mn: 1.35 Ti: 0.08 other elements<0.05 each and 0.15 au total, balance aluminum, The alloy AA4343 had the following composition (wt %):

Si: 7.2 Fe: 0.15 Cu:<0.1 Mn:<0.1 Ti:<0.05 other elements<0.05 each and 0.15 au total, balance aluminum, The alloys A, B and C, for intermediate cladding layer according to the invention, had the compositions such as in table 2 hereinafter (wt %):

TABLE 2

| Slab number | Si | Fe | Cu | Mn | Mg | Cr | Zn | Zr | Ti |
|---|---|---|---|---|---|---|---|---|---|
| A | 0.11 | 0.21 | 0.007 | 0.36 | 0.001 | 0.001 | 0.004 | 0.001 | 0.019 |
| B | 0.101 | 0.16 | 0.002 | 0.71 | 0.001 | 0.001 | 0.004 | 0.002 | 0.020 |
| C | 0.10 | 0.14 | 0.001 | 1.35 | 0.001 | 0.001 | 0.002 | 0.002 | 0.016 |

After casting and scalping the AA3916 core alloy slab was subjected to a homogenization at 600° C. for 10 hours.

Assemblies were carried out using these slabs in such a way as to obtain, at the end of the transformation, cladding percentages (as a % of total thickness) from 7.5 to 8% for all claddings.

Rolling Trials

Preliminary Trials

Assemblies with intermediate cladding in AA1050 such as hereinbelow were as such made, with the side opposite the core receiving a single cladding in AA4343, as in all of the following cases:

|  | Si | Fe | Cu | Mn | Ti |
|---|---|---|---|---|---|
| Core: AA3916 | <0.2 | <0.2 | 0.65 | 1.35 | 0.08 |
| AA4343 brazing cladding | 7.2 | <0.3 | <0.1 | <0.1 | <0.05 |
| Intermediate cladding: AA1050 | 0.11 | 0.21 | 0.0074 | <0.05 | 0.019 |

These assemblies were hot rolled, then cold rolled, in order to try to produce cladded strips with a thickness of 0.40 mm.

But, as shown in FIG. 5 (x-axis 1050), the rolling did not allow for the cladding of the AA1050 alloy in 75% of the cases (three cases out of four).

The same trials were conducted, but by substituting an AA3003 alloy for the AA1050 alloy. FIG. 5 (x-axis 3003) shows that the result is good or satisfactory in all cases.

| Trial A | | | | | |
|---|---|---|---|---|---|
|  | Si | Fe | Cu | Mn | Ti |
| Core: AA3916 | <0.2 | <0.2 | 0.65 | 1.35 | 0.08 |
| AA4343 brazing cladding | 7.2 | <0.3 | <0.1 | <0.1 | <0.05 |
| Intermediate cladding: A | 0.11 | 0.21 | 0.0074 | 0.36 | 0.020 |

Assemblies with intermediate cladding A such as hereinbelow were developed in the same way:

These assemblies were hot rolled, then cold rolled, in order to try to produce cladded strips with a thickness of 0.40 mm.

This rolling was a success, despite a few overflows of the intermediate cladding without consequence on the final brazing sheet.

| Trial B | | | | | |
|---|---|---|---|---|---|
|  | Si | Fe | Cu | Mn | Ti |
| Core: AA3916 | <0.2 | <0.2 | 0.65 | 1.35 | 0.08 |
| AA4343 brazing cladding | 7.2 | <0.3 | <0.1 | <0.1 | <0.05 |
| Intermediate cladding: B | 0.10 | 0.16 | 0.0024 | 0.71 | 0.019 |

Assemblies with intermediate cladding B such as hereinbelow were developed in the same way:

These assemblies were hot rolled, then cold rolled, in order to try to produce cladded strips with a thickness of 0.40 mm.

As shown in FIG. 5 (X-axis B), the rolling was good or satisfactory in all cases, analogous to that obtained with an intermediate cladding with AA3003 alloy.

| Trial C | | | | | |
|---|---|---|---|---|---|
|  | Si | Fe | Cu | Mn | Ti |
| Core: AA3916 | <0.2 | <0.2 | 0.65 | 1.35 | 0.08 |
| AA4343 brazing cladding | 7.2 | <0.3 | <0.1 | <0.1 | <0.05 |
| Intermediate cladding: C | 0.10 | 0.14 | 0.0010 | 1.35 | 0.016 |

Assemblies with intermediate cladding C such as hereinbelow were developed in the same way:

These assemblies were hot rolled, then cold rolled, in order to try to produce cladded strips with a thickness of 0.40 mm.

The results were good, as shown in FIG. 5 (X-axis C) with a laminability close to that obtained with the AA3003 alloy.

Resistance to Corrosion Test

These strips, coming from the trials A, B and C, were subjected to a final annealing treatment at a temperature of 400° C. for one hour.

They then were subjected to a brazing cycle simulation comprising an increase in temperature at 40° C./min to 550° C. then at 20° C./min to 600° C. with a step of 2 min at 600° C. The cooling was carried out in the oven at −60° C./min.

Various samples cut from the aforementioned strips, with intermediate layers A, B and C, with dimensions of 45 mm (L)×65 mm (TL)×0.40 mm were prepared in such a way as to expose only the surface to be tested, i.e. that of the side on which the intermediate layer is, with the rives and the rear surface being protected respectively with the silicone and adapted adhesive. In light of this preparation, the exposed surface was 2400 mm²±100.

These samples were characterized for resistance to corrosion using a cyclical test of resistance to synthetic condensates developed specifically by the applicant for application to the particular corrosion conditions of CACs (charge air coolers).

The latter is carried out in a climatic chamber at a temperature of 50° C. and is comprised of a phase of spraying (similar to a saline mist) of the synthetic condensate followed by a phase of drying ten a phase of exposure to humidity (% RH>95). The phase of spraying the condensates is followed by a phase of "flushing" (evacuation of the remaining condensate mist) and of rinsing the walls of the chamber.

The details of the unfolding of the cycle are shown in FIG. 6.

The duration of exposure was set to 6 weeks. The synthetic condensate was comprised of a mixture of nitric acid and of sulfuric acid with the addition of chlorides. An equimolar solution at 0.005 mole of $HNO_3$ and $H_2SO_4$ was used corresponding to a pH equal to 2 and containing 1000 ppm of ions $Cl^-$ obtained by adding NaCl.

After the exposure, optical metallographic cross-sections (direction L×TC) were carried out.

They revealed, on the sheets coming from trials A, B and C, a lateralization of the corrosion in the intermediate cladding layer and the absence of perforation of the underlying core sheet.

This behavior is similar to that observed in the case of an intermediate cladding with AA1050 alloy and clearly better than that observed in the case of an intermediate cladding with AA3003 alloy. For the latter, after 6 weeks of exposure, the core reveals substantial corrosion of the intergranular type affecting up to 80% of the thickness of the sheet.

Various samples coming from the various aforementioned configurations, with intermediate layers A, B and C, sampled as hereinabove, were characterized in resistance to corrosion according to the standard ASTM G85-A3 (SWAAT test "Sea Water Acidified Acetic Test"). This last test is generally used in order to estimate the resistance to corrosion of the air conditioning evaporators.

The samples were removed after 8 weeks of exposure, rinsed with hot water then stripped for 3 min with nitric acid at 70%.

Cross-section micrographs (direction L×TC) were then carried out. They confirm a location of the starting of the corrosion on the eutectic needles coming from the re-solidification during the brazing cycle then the propagation and the lateralization of the corrosion in the intermediate cladding layer which plays its sacrificial role although the absence of perforation of the underlying core is noted. At most, the few penetrations observed on the core do not exceed 30% of the thickness in the case of the configurations A & B and 50% of the thickness in the case of the configuration C after 8 weeks of exposure.

This behavior is better than, or at least equivalent to, that observed in the case of an intermediate cladding of the type AA3003 for which the corrosion affects up to 50% of the thickness of the product.

The invention claimed is:

1. Brazing sheet of a series AA3xxx aluminum alloy core sheet, coated, on at least one side, with a cladding layer made of a first intermediate aluminum alloy comprising 0.35 to 1.8 wt % manganese, less than 0.3 wt % Si, less than 0.3 wt % Fe, less than 0.05 wt % Cu, less than 0.02 wt % Mg, less than 0.15 wt % Cr, less than 0.15 wt % Ti, less than 0.15 wt % Zr, other elements less than 0.05 wt % each and 0.15 wt % in total, with a total of less than 1 wt % of Si, Fe, Cu, Mg, Cr, Ti, Zr, and the other elements, and a balance aluminum, that is coated with a series AA4xxx alloy cladding layer,
   wherein the core is made of series AA3xxx aluminum alloy having been subjected, after casting and before rolling, to homogenization at a temperature from 550 to 630° C. for at least one hour, in which the alloy of the core sheet has an essentially recrystallized structure before brazing, and wherein the proportion of recrystallized grains is at least 90% in the essentially recrystallized structure, and
   wherein the brazing sheet after brazing comprises a lifespan without perforation of the core sheet to the SWAAT test, according to the standard ASTM G85-A3, of at least 8 weeks.

2. The brazing sheet according to claim 1, wherein the content in Mn of the intermediate layer is between 0.35 and 1.7%.

3. The brazing sheet according to claim 1, wherein the composition of the intermediate layer is as follows (wt %):
   Si:<0.2 Fe<0.2 Cu<0.05 Mn: 0.35-1.4 Mg<0.02 Cr<0.05 Ti<0.15 Zr<0.05, other elements<0.05 each and 0.15 in total, balance aluminum.

4. The brazing sheet according to claim 1, wherein the content in Mn of the intermediate layer is between 0.5 and 0.9%.

5. The brazing sheet according to claim 1, wherein the content in Mg of the intermediate layer is at most 0.01%.

6. The brazing sheet according to claim 1, wherein the side of the core sheet opposite said coated side of said first intermediate cladding layer is coated with a series AA4xxx alloy cladding layer.

7. The brazing sheet according to claim 1, comprising a side of the core sheet opposite the side coated with the first intermediate cladding layer, another intermediate cladding layer of the same composition as the first, that is coated with a series AA4xxx alloy cladding layer.

8. The brazing sheet according to claim 1 wherein the cladding layers, intermediate and external made of an alloy of the AA4xxx type, each have a thickness from 5 to 10% of the total thickness of the brazing sheet.

9. The brazing sheet according to claim 1 for the manufacture of a motor vehicle heat exchanger.

10. The brazing sheet according to claim 1 for the manufacture of a heat exchanger of the charge air cooler (CAC) type.

11. The brazing sheet according to claim 1 for the manufacture of a heat exchanger of the "Evaporator" type in air conditioning circuits.

12. Heat exchanger of the charge air cooler (CAC) type manufactured from the brazing sheet according to claim 1.

13. Heat exchanger of the "Evaporator" type of an air conditioning circuit manufactured from the brazing sheet according to claim 1.

14. The brazing sheet according to claim 1, wherein said first intermediate aluminum alloy consists of 0.35 to 1.8 wt % manganese, less than 0.3 wt % of each of other elements, with a total of less than 1 wt % of the other elements, and a balance aluminum, that is coated with a series AA4xxx alloy cladding layer.

15. The brazing sheet according to claim 1, wherein the composition of the intermediate layer consists of (wt %):
   Si:<0.2 Fe<0.2 Cu<0.05 Mn: 0.35-1.4 Mg<0.02 Cr<0.05 Ti<0.15 Zr<0.05, other elements<0.05 each and 0.15 in total, balance aluminum.

16. The brazing sheet according to claim 15, comprising a side of the core sheet opposite the side coated with the first intermediate cladding layer, another intermediate cladding layer of the same composition as the first, that is coated with a series AA4xxx alloy cladding layer.

17. The brazing sheet according to claim 15 wherein the cladding layers, intermediate and external made of an alloy of the AA4xxx type, each have a thickness from 5 to 10% of the total thickness of the brazing sheet.

* * * * *